(12) United States Patent
Ellyson et al.

(10) Patent No.: US 8,141,584 B1
(45) Date of Patent: Mar. 27, 2012

(54) WATER COLLECTION, STORAGE, AND DISTRIBUTION SYSTEM

(75) Inventors: Scott Ellyson, Atlanta, GA (US); Jeff Sweeney, Atlanta, GA (US)

(73) Assignee: East West Manufacturing LLC, Atlanta, GA (US)

( * ) Notice: Subject to any disclaimer, the term of this patent is extended or adjusted under 35 U.S.C. 154(b) by 527 days.

(21) Appl. No.: 12/468,146

(22) Filed: May 19, 2009

Related U.S. Application Data

(60) Provisional application No. 61/056,471, filed on May 28, 2008.

(51) Int. Cl.
*E03B 7/12* (2006.01)

(52) U.S. Cl. ..... 137/571; 137/62; 137/395; 137/565.11; 126/640

(58) Field of Classification Search ............ 137/59, 137/62, 571, 395, 565.11, 255, 263; 126/640
See application file for complete search history.

(56) References Cited

U.S. PATENT DOCUMENTS

| | | | | |
|---|---|---|---|---|
| 4,446,804 A | * | 5/1984 | Kristiansen et al. | 137/263 |
| 5,240,179 A | * | 8/1993 | Drinkwater | 137/59 |
| 5,851,384 A | * | 12/1998 | Shen | 137/395 |
| 6,422,263 B1 | * | 7/2002 | Spicer | 137/571 |

* cited by examiner

*Primary Examiner* — Kevin Lee

(74) *Attorney, Agent, or Firm* — Smith Gambrell & Russell, LLP

(57) ABSTRACT

A water collection, storage, and distribution system includes one or more individual water storage tanks. Each water storage tank has its own microprocessor that controls the operation of the storage tank so that each storage tank can operate either as a stand-alone storage tank or can be integrated into a series or a daisy chain of storage tanks. Each individual storage tank monitors its water level, its temperature, and its flow rate. When a risk of freezing exists, based on time and temperature, the storage tank can dump water. When the water in the storage tank is approaching stagnation, based on flow rate and time, the storage tank can dump water. When a storage tank is part of a daisy chain of storage tanks, each individual tank monitors not only its own water level but also the water level of the next downstream storage tank and pumps water to the downstream storage tank as required.

15 Claims, 2 Drawing Sheets

WATER COLLECTION, STORAGE, AND DISTRIBUTION SYSTEM

CLAIM OF PRIORITY

This application claims priority from U.S. Provisional Patent Application Ser. No. 61/056,471, filed on May 28, 2008, which is incorporated herein in its entirety.

FIELD OF THE INVENTION

This invention relates to a water collection, storage, and distribution system for gray water, rainwater, condensate water, and water from any other source that might otherwise be dumped into a local water system or become part of water run off from a property.

BACKGROUND OF THE INVENTION

A water collection, storage, and distribution system is needed, in both new and existing construction, to allow the efficient and effective recycling of gray water, rainwater, condensate water, or water from any other source. Such a water collection, storage, and distribution system can reduce fresh, potable water consumption, particularly fresh, potable water consumption from a water provider that charges a fee for fresh water consumption, such as a metered municipal water authority. The water collection, storage, and distribution system should be easy to identify, buy, and install for both contractors and the "do-it-yourself" market. The water collection, storage, and distribution system resolves the following problems that are found in existing water collection, storage, and distribution systems.

Existing water collection and storage tanks work as individual collection devices. No easy system or method exists for integrating multiple tanks together from various collection points to function as a unitary water collection, storage, and distribution system.

In colder environments, existing exterior collection and storage tanks may crack or break when the temperature drops below freezing, and the water in the tank turns to ice.

Gray water, rainwater, and condensate water that is collected in an existing collection and storage tank will turn stagnate and unsanitary if the water is not used shortly after it is collected.

Current water collection systems for existing homes or other buildings (for either gray water or rainwater collection) require research, time, and piece-meal construction, which, in turn, requires both ingenuity and above-average motivation on the part of the consumer or a contractor providing such a service.

The average home or building produces a significant amount of condensate water and dehumidifier water that is typically drained outside or into a sewer drain. While this condensate water tends to be very clean, it is rarely reused due to the challenges in water distribution from the collection point.

SUMMARY OF THE INVENTION

The present invention addresses the problems identified above. The present invention is a water collection, storage, and distribution system comprising one or more individual water storage tanks. Each individual water storage tank is a smart water storage tank with its own microprocessor that controls the operation of the storage tank so that each storage tank can operate either as a stand-alone storage tank or can be integrated into a series or daisy chain of storage tanks. Each individual storage tank has a primary inlet for receiving water from a water source, such as a condensate water source, a gray water source, a rainwater source, or any other water source. Each individual storage tank also has a secondary inlet for receiving water from the next upstream storage tank, if an upstream storage tank is connected.

Each individual storage tank also has a primary outlet for delivering water to the next downstream storage tank or, in the case of the last downstream storage tank in the daisy chain, for delivering water to a water utilization system for watering landscaping, filling a swimming pool, or other use not requiring fresh, potable water. Each individual storage tank also has an alternate outlet for dumping water to an alternate destination, such as a sewer drain, and a safety overflow outlet for dumping excess overflow water to such alternate destination.

Each individual storage tank has a pump for delivering water at a constant pressure to either the primary outlet or to the alternate outlet. Each individual storage tank has a water level sensor for monitoring the water level in the storage tank. The water level sensor in each storage tank is connected to the microprocessor for each storage tank so that each storage tank is capable of monitoring its water level. Each individual storage tank also has a water temperature sensor and a water flow sensor connected to the storage tank's microprocessor. Each storage tank also has a slot or tray that allows biostat pills to be inserted into the storage tank in order to inhibit the growth of algae or other bio-hazards associated with standing water in a storage tank.

When the individual storage tank is used as a stand-alone storage tank, the primary inlet is connected to a water source, such as a condensate water source, a gray water source, a rainwater source, or any other water source. The secondary inlet, which is normally connected to the next upstream storage tank, is not used in the stand-alone mode. The primary outlet is connected to the water utilization system, such as a landscape irrigation system. The alternate outlet is connected to an alternate destination, such as a sewer drain, where water from the storage tank can be dumped as necessary. As water fills the storage tank through the primary inlet, the water level sensor measures the level of the water in the storage tank and communicates that information to the microprocessor. Once the storage tank is full and there is no call for water from the water utilization system, the microprocessor activates the pump to dump water from the storage tank through the alternate outlet to the alternate destination. In the circumstance when there is a failure of the microprocessor control of the pump or failure of the pump itself, the storage tank has a safety overflow outlet which, when the storage tank reaches an overflow condition, dumps the excess water to the alternate destination.

In order to keep the water in the storage tank from freezing and cracking the storage tank during cold weather, the temperature sensor in the storage tank continuously monitors the temperature of the water in the storage tank and communicates that information to the microprocessor. When the temperature of the water in the storage tank falls below a specified temperature for a specified period of time, thereby indicating that the possibility of freezing exists, the microprocessor activates the pump to dump water from the storage tank through the alternate outlet to the alternate destination. In addition, for less severe conditions called the storage tank may be equipped with a heater that is activated by the microprocessor when the possibility of freezing exists.

In order to avoid stagnation of the water in the storage tank, the water flow sensor measures the flow of water through the pump and out of the storage tank and communicates that information to the microprocessor. When the flow of water from the tank is below a specified level for a specified period of time, the microprocessor determines that the water in the tank is about to become or has become stagnant and activates the pump to dump water from the storage tank through the alternate outlet to the alternate destination. The use of a biostat pill in the storage tank may increase the specified period of time before the water in the storage tank is considered stagnant and should be dumped.

When more than one individual storage tanks are connected in a series or a daisy chain, the primary outlet of the last downstream storage tank is connected to the water utilization system, such as a landscape irrigation system. The primary outlet of each of the other storage tanks in the daisy chain is connected to the secondary inlet of the next downstream storage tank. The microprocessor of each of the individual storage tanks is connected to a data bus so that the microprocessors in the daisy chain of storage tanks can communicate with each other. Each microprocessor of each individual storage tank monitors the water level in its own storage tank and monitors the water level in the next downstream storage tank. When the microprocessor for a particular (current) storage tank determines that the water level in the next downstream storage tank has fallen below a specified level, the microprocessor for the current storage tank activates the pump to deliver water from the current storage tank through the primary outlet to the secondary inlet of the next downstream storage tank. Once the next downstream storage tank is full and the water level in the current storage tank reaches a specified full level, the microprocessor for the current storage tank activates the pump to dump additional water from the current storage tank through the alternate outlet to the alternate destination. Consequently, as water enters the water collection, storage, and distribution system through the primary inlets of each of the storage tanks, the water is pushed through the individual storage tanks in the daisy chain toward the last downstream storage tank that is connected to the water utilization system.

While each microprocessor is capable of monitoring and controlling the operation of its own storage tank and is capable of monitoring the water level of the next downstream storage tank, one of the microprocessors in the daisy chain of microprocessors can serve as a master controller to monitor the performance of the other microprocessors as well as compile data relating to the overall performance of the water collection, storage and distribution system.

The present invention also includes a smart pump that can be incorporated into any existing storage tank or rain barrel. The smart pump comprises a pump, a water level sensor, a temperature sensor, a water flow sensor, a diverter valve, and a microprocessor. When the smart pump is installed in an existing storage tank or rain barrel, the smart pump provides the capabilities of maintaining a proper water level for the water in the existing storage tank, avoiding freezing of the water in the existing storage tank, and of avoiding stagnation of the water in the existing storage tank.

The water collection, storage, and distribution system also may employ solar panels attached to the storage tanks in order to drive the pumps as well as the electronics associated with the microprocessors.

Further objects, features and advantages will become apparent upon consideration of the following detailed description of the invention when taken in conjunction with the drawings and the appended claims.

DETAILED DESCRIPTION OF THE PREFERRED EMBODIMENT

Figure 1:
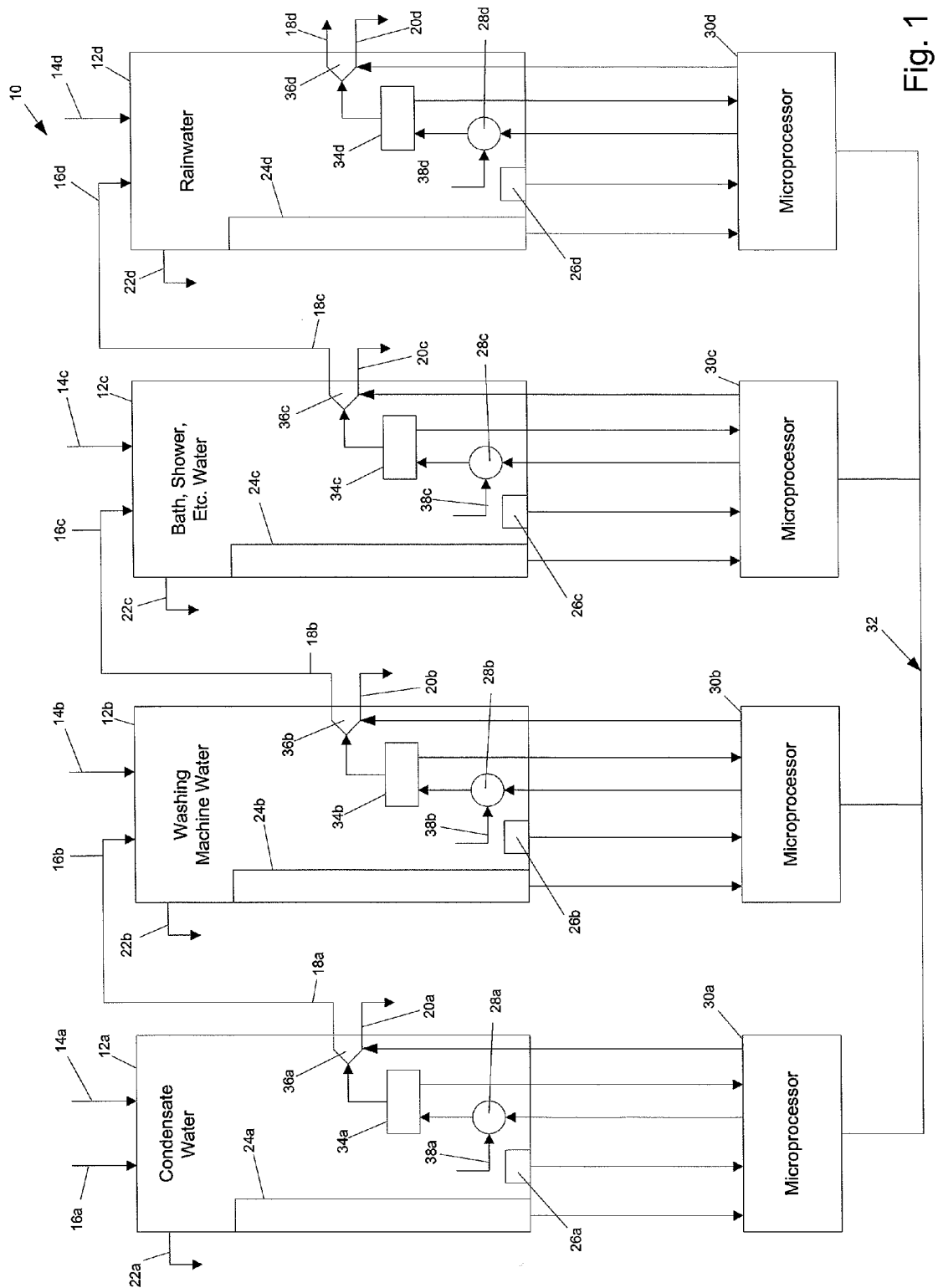
FIG. 1 is a schematic diagram of a water collection, storage, and distribution system in accordance with the present invention.

Turning to FIG. 1, a water collection, storage, and distribution system 10 comprises a series or daisy chain of individual water collection and storage tanks 12a, 12b, 12c, and 12d. In FIG. 1, the downstream water flow direction is from the first upstream storage tank 12a, through storage tanks 12b and 12c, to the last downstream storage tank 12d. Each of the water storage tanks 12a, 12b, 12c, and 12d may be any size and constructed of any material suitable for collecting and storing water. In a preferred embodiment, the storage tanks 12a, 12b, 12c, and 12d are 55 gallon storage tanks made of 100% recycled plastic. Each of the storage tanks 12a, 12b, 12c, and 12d has an access cover to allow access to the interior of the tank for the purposes of cleaning and maintenance. The access cover can be secured and rendered childproof. By way of example, storage tank 12a collects condensate water from a source of condensate water, such as an air conditioner or dehumidifier, in the user's house or other facility. Storage tank 12b collects grey water from a washing machine in the user's house or other facility. Storage tank 12c collects grey water from a bath, shower, lavatory, etc. in the user's house or other facility. Storage tank 12d collects rainwater from the downspouts of the user's house or other facility.

Each of the water storage tanks 12a, 12b, 12c, and 12d has its own microprocessor 30a, 30b, 30c, or 30d, respectively. Each of the microprocessors 30a, 30b, 30c, and 30d controls the operation of its connected storage tank 12a, 12b, 12c, or 12d so that each of the storage tanks 12a, 12b, 12c, and 12d can operate either as a stand-alone storage tank or can be integrated into a series or a daisy chain of storage tanks, such as storage tanks 12a, 12b, 12c, and 12d shown in FIG. 1. Each of the microprocessors 30a, 30b, 30c, and 30d has a display and means for setting the operational parameters for the water collection, storage, and distribution system 10.

Each of the individual storage tanks 12a, 12b, 12c, and 12d has a primary inlet 14a, 14b, 14c, or 14d for receiving water from a water source, such as a condensate water source (primary inlet 14a), a gray water source (primary inlets 14b and 14c), a rainwater source (primary inlet 14d), or any other water source. Each of the individual storage tanks 12a, 12b, 12c, and 12d also has a secondary inlet 16a, 16b, 16c, or 16d for receiving water from the next upstream storage tank, if an upstream storage tank is present and connected. For example, secondary inlet 16a is not used in the water collection, storage, and distribution system 10 shown in FIG. 1 because there is no storage tank connected upstream from storage tank 12a.

Each of the individual storage tanks 12a, 12b, 12c, and 12d also has a primary outlet 18a, 18b, 18c, or 18d for delivering water from the storage tank 12a, 12b, 12c, or 12d to the next downstream storage tank. For example, the primary outlet 18a of the storage tank 12a is connected to the secondary inlet 16b of the next downstream storage tank 12b for delivering water from the storage tank 12a to the next downstream storage tank 12b. In the case of the last downstream storage tank 12d in the daisy chain, the primary outlet 18d is connected to a water utilization system (not shown) for delivering water from the last downstream storage tank 12d to the water utilization system for watering landscaping, filling a swimming pool, or other use not requiring fresh, potable water. Each of the individual storage tanks 12a, 12b, 12c, and 12d also has an alternate outlet 20a, 20b, 20c, or 20d for dumping water to an alternate destination, such as a sewer drain (not shown), and a safety overflow outlet 22a, 22b, 22c, or 22d for dumping overflow water from each of the storage tanks 12a, 12b, 12c, and 12d to the alternate destination.

Each of the individual storage tanks 12a, 12b, 12c, and 12d has a pump 28a, 28b, 28c, or 28d with a pump intake 38a, 38b, 38c, or 38d for pumping water from the storage tanks 12a, 12b, 12c, and 12d at a constant pressure through a water flow sensor 34a, 34b, 34c, or 34d and then through either the primary outlet 18a, 18b, 18c, or 18d or to the alternate outlet 20a, 20b, 20c, or 20d. The primary outlet 18a, 18b, 18c, or 18d and the alternate outlet 20a, 20b, 20c, or 20d are alternatively selected by means of a diverter valve 36a, 36b, 36c, or 36d, which is controlled by the microprocessor 30a, 30b, 30c, or 30d. The pumps 28a, 28b, 28c, and 28d are preferably submersible pumps integrated into each of the storage tanks 12a, 12b, 12c, and 12d. Each of the individual storage tanks 12a, 12b, 12c, and 12d has a water level sensor 24a, 24b, 24c, or 24d for measuring the water level in each of the storage tanks 12a, 12b, 12c, and 12d. Each of the water level sensors 24a, 24b, 24c, and 24d in each of the storage tanks 12a, 12b, 12c, and 12d is connected to each of the microprocessors 30a, 30b, 30c, and 30d for each of the storage tanks 12a, 12b, 12c, and 12d so that the microprocessors 30a, 30b, 30c, and 30d can determine the water level in each of its connected storage tanks 12a, 12b, 12c, and 12d. Each of the individual storage tanks 12a, 12b, 12c, and 12d also has a water temperature sensor 26a, 26b, 26c, or 26d connected to each of the storage tank's microprocessors 30a, 30b, 30c, and 30d so that the microprocessors 30a, 30b, 30c, and 30d can determine the temperature of the water in each of the storage tanks 12a, 12b, 12c, and 12d. Likewise, each of the water flow sensors 34a, 34b, 34c, and 34d is connected to each of the storage tank's microprocessors 30a, 30b, 30c, and 30d so that the microprocessors 30a, 30b, 30c, and 30d can monitor the flow rate of water through each of the storage tanks 12a, 12b, 12c, and 12d. Each of the storage tanks 12a, 12b, 12c, and 12d also has a slot or tray (not shown) that allows biostat pills (not shown) to be inserted into each of the storage tanks in order to inhibit the growth of algae or other bio-hazards associated with standing water in each of the storage tanks 12a, 12b, 12c, and 12d.

When an individual storage tank 12a, 12b, 12c, or 12d, such as storage tank 12d, is used as a stand-alone storage tank, the primary inlet 14d is connected to a water source, for example a rainwater source. The secondary inlet 16d, which in a multi-tank daisy chain configuration is connected to the next upstream storage tank 12c, is not used or connected in the stand-alone mode. The primary outlet 18d is connected to the water utilization system (not shown), such as a landscape irrigation system. The alternate outlet 20d is connected to an alternate destination, such as a sewer drain, where water from the stand-alone storage tank 12d can be dumped as necessary. When the storage tank 12d receives a call for water from the water utilization system, such as an irrigation system, the microprocessor 30d instructs the diverter valve 36d to select the primary outlet 18d and activates the pump 28d to pump water from the storage tank 12d through the primary outlet 18d to the water utilization system. A call for water from the water utilization system can result from several inputs to the microprocessor 30d including, but not limited to, a manual start switch connected to the microprocessor 30d, a moisture sensor embedded in the landscaping that produces a start signal in response to dry conditions, or a pressure sensor at the primary output 18d that sense is a pressure drop when an external valve is manually opened to the water utilization system.

As water fills the storage tank 12d through the primary inlet 14d, the water level sensor 24d measures the level of the water in the storage tank 12d and communicates that information to the microprocessor 30d. Once the microprocessor 30d has determined that the storage tank 12d is full and there is no call for water from the water utilization system, the microprocessor 30d instructs the diverter valve 36d to select the alternate outlet 20d and activates the pump 28d to dump water from the storage tank 12d through the alternate outlet 20d to the alternate destination. If there is a failure of the microprocessor 30d or a failure of the pump 28d, the storage tank 12d has a safety overflow outlet 22d which, when the storage tank 12d reaches an overflow condition, dumps the excess water to the alternate destination.

In order to keep the water in the storage tanks 12a, 12b, 12c, and 12d from freezing and cracking the storage tanks 12a, 12b, 12c, and 12d during cold weather, the temperature sensors 26a, 26b, 26c, and 26d in each of the storage tanks 12a, 12b, 12c, and 12d continuously measures the temperature of the water in each of the storage tanks 12a, 12b, 12c, and 12d and communicates that information to the microprocessors 30a, 30b, 30c, and 30d. When the temperature of the water in any of the storage tanks 12a, 12b, 12c, and 12d falls below a specified temperature for a specified period of time, thereby indicating that the possibility of freezing exists, the microprocessors 30a, 30b, 30c, and 30d instruct the diverter valves 36a, 36b, 36c, and 36d to select the alternate outlets 20a, 20b, 20c, and 20d and activate the pumps 28a, 28b, 28c, and 28d to dump water from the storage tanks 12a, 12b, 12c, and 12d through the alternate outlets 20a, 20b, 20c, and 20d to the alternate destinations. Where freezing conditions are less severe, each of the storage tanks 12a, 12b, 12c, and 12d may be provided with a heater that is activated by each of the microprocessors 30a, 30b, 30c, and 30d when the possibility of freezing first exists. If the severity of the freezing conditions increases, the microprocessors may deactivate the heaters and dump the water from the storage tanks 12a, 12b, 12c, and 12d through the alternate outlets 20a, 20b, 20c, and 20d.

In order to avoid stagnation of the water in each of the storage tanks 12a, 12b, 12c, and 12d, the water flow sensors 34a, 34b, 34c, and 34d measure the flow of water through the pumps 28a, 28b, 28c, and 28d and out of the storage tanks 12a, 12b, 12c, and 12d and communicates that information to the microprocessors 30a, 30b, 30c, and 30d. When the flow of water from each of the tanks 12a, 12b, 12c, and 12d is below a specified level for a specified period of time, the microprocessors 30a, 30b, 30c, and 30d determine that the water in each of the tanks is about to become stagnant or has become stagnant. Once the microprocessors 30a, 30b, 30c, and 30d have determined that the water is about to become stagnant or has become stagnant, the microprocessors 30a, 30b, 30c, and 30d instruct the diverter valves 36a, 36b, 36c, and 36d to select the alternate outlets 20a, 20b, 20c, and 20d and activate the pumps 28a, 28b, 28c, and 28d to dump water from the storage tanks through the alternate outlets 20a, 20b, 20c, and 20d to the alternate destination, such as a sewer drain. The use of a biostat pill in the storage tanks may increase the specified period of time before the water in the storage tanks 12a, 12b, 12c, and 12d is considered stagnant and should be dumped. The water flow sensors 34a, 34b, 34c, and 34d also allow the microprocessors to collect data concerning the amount of water passing through the water collection, storage, and distribution system 10 for the purposes of determining efficiency of the collection, storage, and distribution system 10.

When more than one individual storage tank 12a, 12b, 12c, or 12d is connected in a series or a daisy chain as shown in FIG. 1, the primary outlet 18d of the last downstream storage tank 12d is connected to the water utilization system, such as a landscape irrigation system. The other primary outlets 18a, 18b, and 18c of each of the other storage tanks 12a, 12b, and 12c in the daisy chain are connected to the secondary inlets 16b, 16c, and 16d of the next downstream storage tanks 12b, 12c, and 12d, respectively. The microprocessors 30a, 30b, 30c, and 30d of each of the individual storage tanks 12a, 12b, 12c, and 12d are connected to a data buses 32a, 32b, 32c, and 32d so that the microprocessors 30a, 30b, 30c, and 30d can communicate with one another. Each of the microprocessors 30a, 30b, 30c, and 30d of each of the individual storage tanks 12a, 12b, 12c, and 12d monitors the water level in its own (current) storage tank 12a, 12b, 12c, or 12d and monitors the water level in the next downstream storage tank. For example, when the microprocessor 30b for a particular (current) storage tank 12b determines that the water level in the next downstream storage tank 12c has fallen below a specified level, the microprocessor 30b for the current storage tank 12b activates the pump 28b to deliver water from the current storage tank 12b through the primary outlet 18b to the secondary inlet 16c of the next downstream storage tank 12c. Once the next downstream storage tank 12c is full and the water level in the current storage tank 12b reaches a specified full level, the microprocessor 12b for the current storage tank 12b instructs the diverter valve 36b to select the alternate outlet 20b and activates the pump 28b to dump additional water from the current storage tank 12b through the alternate outlet 20b to the alternate destination. Consequently, as water enters the water collection, storage, and distribution system 10 through the primary inlets 14a, 14b, 14c, and 14d of each of the storage tanks 12a, 12b, 12c, and 12d, the water is pumped through the individual storage tanks 12a, 12b, and 12c in the daisy chain toward the last downstream storage tank 12d that is connected to the water utilization system. The daisy chain configuration and networking of the storage tanks 12a, 12b, 12c, and 12d maximizes water collection efficiency because the multiple storage tanks 12a, 12b, 12c, and 12d may be placed at various collection points around a house or facility (i.e. washing machine, condensate line, de-humidifier, downspout, etc.). The storage tanks 12a, 12b, 12c, and 12d, distributed as necessary around the house or facility and functionally linked together in a network of storage tanks 12a, 12b, 12c, and 12d, work in unison with respect to overall collection, storage, and distribution of water.

The water collection, storage, and distribution system 10 may further include photovoltaic panels attached to each of the storage tanks 12a, 12b, 12c, and 12d that are placed outside and exposed to sunlight. The photovoltaic panels can generate electricity to drive the pumps 28a, 28b, 28c, and 28d and the electronics associated with the microprocessors 30a, 30b, 30c, and 30d. The water collection, storage, distribution system 10 also may include a solar heating system comprising an array of solar absorber panels for capturing heat during daylight hours, a heat sink for storing the capture heat, a heat exchanger for delivering the heat to the water in the storage tank during nighttime hours, and a solar circulation pump for circulating coolant from the absorber panels to the heat sink and to the heat exchanger. The operation of the solar heating system is controlled by the microprocessor. The microprocessor monitors the water temperature in storage tank and the temperature of the heat sink and activates the solar circulation pump to cause the heat sink to deliver heat to the storage tank when the possibility of freezing exists in order to delay the need to dump water from the storage tank.

Figure 2:
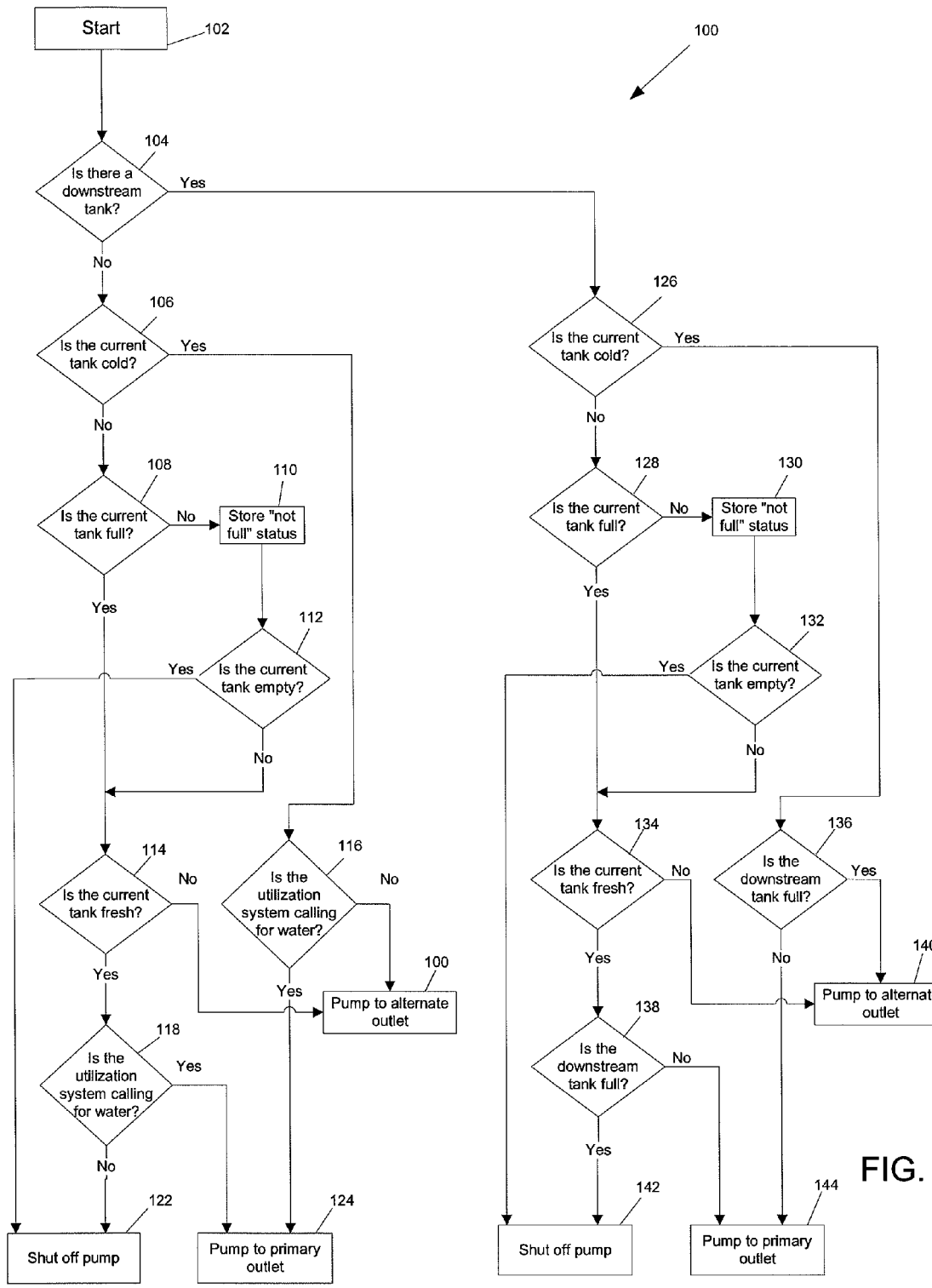
FIG. 2 flowchart illustrating the operation of a microprocessor that controls the operation of each collection and storage tank in the water collection, storage, and distribution system in accordance with the present invention.

Each of the microprocessors 30a, 30b, 30c, and 30d is programmed to control the operation of its connected storage tank 12a, 12b, 12c, or 12d. FIG. 2 is a flowchart that illustrates the functionality and method for an illustrative program 100 for each of the microprocessors 30a, 30b, 30c, and 30d used to monitor and control the operation of its own individual storage tank. The program 100 starts at step 102 and moves to step 104. At step 104, the program determines whether a downstream storage tank is connected to the current storage tank. If at step 104, the program determines that no downstream storage tank is connected to the current storage tank, the current storage tank is the last downstream storage tank, and the program follows the "no" branch to step 106.

At step 106, the program determines if the current storage tank is at risk for freezing. That determination is made by measuring the water temperature in the current storage tank, determining the amount of time that the water temperature has been at the measured temperature, and analyzing the trend toward the possibility of the water in the current storage tank freezing. If at step 106, the program determines that the possibility of freezing exists, the program follows the "yes" branch to step 116. At step 116, the program determines whether the water utilization system (such as an irrigation system) is calling for water. If at step 116, the program determines that the water utilization system is calling for water, then the program follows the "yes" branch to step 124, where the pump is activated, and the water in the current storage tank is directed by means of the diverter valve to the primary outlet and therefore to the water utilization system. If, on the other hand, the water utilization system is not calling for water at step 116, the program follows the "no" branch to step 120, where the pump is activated, and the water in the current storage tank is directed by means of the diverter valve to the alternate outlet nearby dumping the water from the current storage tank to avoid the possibility of freezing.

If at step 106, the program determines that the water in the current storage tank is not likely to freeze, the program follows the "no" branch to step 108. At step 108, the program determines whether the current storage tank is full. If at step 108, the program determines that the current storage tank is not full, the program follows the "no" branch to step 110. At step 110, the program stores the water level condition for the current storage tank as "not full". The "not full" condition is available to the microprocessor of the next upstream storage tank by means of the data bus. From step 110, the program moves to step 112, where the program determines whether or not the current storage tank is empty. If the current storage tank is empty, the program follows the "yes" branch from step 112 to step 122, and at step 122 the program shuts off the pump. If, on the other hand, at step 112, the program determines that the current tank is not empty, the program follows the "no" branch to step 114. Likewise, if at step 108, the program determines that the current tank is full, the program follows the "yes" branch to step 114.

At step 114, the program determines whether the water in the current storage tank is fresh or is about to become stagnant based on an analysis of the flow rate through the current storage tank. If at step 114, the program determines that the water in the current storage tank is about to become stagnant, the program follows the "no" branch to step 120 where the water is pumped through the alternate outlet until the stagnant water has been dumped from the current storage tank.

If at step 114, the program determines that the water in the current storage tank is fresh and not about to become stagnant, the program follows the "yes" branch to step 118. At step 118, the program determines whether the water utilization system is calling for water from the current storage tank.

If the water utilization system is calling for water, the program follows the "yes" branch from step 118 to step 124, and the program activates the pump and the water in the current storage tank is directed to the primary outlet by means of the diverter valve. If, on the other hand, at step 118, the program determines that the water utilization system is not calling for water, the program follows the "no" branch to step 122 and the pump is shut off.

If at step 104, the program determines that the current storage tank is connected to a downstream storage tank, the program determines that the current tank is not the last downstream storage tank and follows the "yes" branch to step 126.

At step 126, the program determines if the current storage tank is at risk for freezing as previously described. If at step 126, the program determines that the possibility of freezing exists, the program follows the "yes" branch to step 136. At step 136, the program determines whether the next downstream storage tank is full. If at step 136, the program determines that the next downstream storage tank is full, then the program follows the "yes" branch to step 140, where the pump is activated, and the water in the current storage tank is directed by means of the diverter valve to the secondary outlet and thereby dumped to avoid the possibility of freezing. If, on the other hand, the program determines at step 136 that the downstream storage tank is not full, the program follows the "no" branch to step 144, where the pump is activated, and the water in the current storage tank is directed by means of the diverter valve to the primary outlet, and the water from the current storage tank is pumped to the next downstream storage tank. Because the next downstream storage tank is also running program 100, the downstream storage tank will also in the same manner determine whether it should dump the water to avoid freezing or to pump the water to the next downstream storage tank or to the water utilization system.

If at step 126, the program determines that the water in the current storage tank is not likely to freeze, the program follows the "no" branch to step 128. At step 128, the program determines whether the current storage tank is full. If at step 128, the program determines that the current storage tank is not full, the program follows the "no" branch to step 130. At step 130, the program stores the water level condition for the current storage tank as "not full". From step 130, the program moves to step 132, where the program determines whether or not the current storage tank is empty. If the current storage tank is empty, the program follows the "yes" branch from step 132 to step 142, and at step 142 the program shuts off the pump. If, on the other hand, at step 132, the program determines that the current tank is not empty, the program follows the "no" branch to step 134. Likewise, if at step 128, the program determines that the current tank is full, the program follows the "yes" branch to step 134.

At step 134, the program determines whether the water in the current storage tank is fresh or is about to become stagnant as previously described. If at step 134, the program determines that the water in the current storage tank is about to become stagnant, the program follows the "no" branch to step 140 where the water is pumped through the alternate outlet until the stagnant water has been dumped from the current storage tank.

If at step 134, the program determines that the water in the current storage tank is fresh and not about to become stagnant, the program follows the "yes" branch to step 138. At step 138, the program determines whether the next downstream storage tank is full. If the next downstream storage tank is full, the program follows the "yes" branch from step 138 to step 142, and the pump is shut off. If, on the other hand, at step 138, the program determines that the next downstream storage tank is not full, the program follows the "no" branch to step 144, the program activates the pump, and the water in the current storage tank is directed to the primary outlet by means of the diverter valve and delivered to the next downstream storage tank.

While this invention has been described with reference to preferred embodiments thereof, it is to be understood that variations and modifications can be affected within the spirit and scope of the invention as described herein and as described in the appended claims.

We claim:

1. A water collection, storage, and distribution system comprising a plurality of storage tanks arranged in series, each storage tank having:
   a. primary inlet connected to a water source for receiving water from the water source;
   b. a secondary inlet for receiving water from an upstream storage tank, if an upstream storage tank is present;
   c. a primary outlet for connection to the secondary inlet of a downstream storage tank, if a downstream storage tank is present, or for connection to a water utilization system, if a downstream storage tank is absent;
   d. an alternate outlet;
   e. a pump for pumping water from the storage tank to either the primary outlet or the alternate outlet;
   f. a water level sensor for measuring the level of water in the storage tank and producing a water level signal for each storage tank; and
   g. a microprocessor associated with each storage tank for receiving the water level signal,
   wherein the microprocessors associated with each storage tank are connected together so that each microprocessor can determine the water level in its connected storage tank and determine the water level of the next downstream storage tank and thereby activate the pump to pump water through the primary outlet to the next downstream storage tank or, if the next downstream storage tank is not full, to activate the pump to pump the water from the storage tank through the alternate outlet if the downstream storage tank is full.

2. The water collection, storage, and distribution system of claim 1, wherein each storage tank further includes a temperature sensor for measuring the temperature of the water in the storage tank and producing a temperature signal, wherein the temperature signal is connected to the microprocessor, and if the microprocessor determines that the water in the storage tank is likely to freeze, the microprocessor activates the pump to pump water from the storage tank through the alternate outlet.

3. The water collection, storage, and distribution system of claim 1, wherein each storage tank further includes a water flow sensor for measuring the flow of water through the storage tank and producing a water flow signal indicative of the flow of water through the storage tank, wherein the water flow signal is connected to the microprocessor, and if the microprocessor determines that the water in the storage tank is about to become stagnant based on the flow of water through the storage tank, the microprocessor activates the pump to pump water from the storage tank through the alternate outlet.

4. The water collection, storage, and distribution system of claim 1, wherein the system further includes a photovoltaic panel associated with each storage tank and connected to the pump, to the microprocessor, or to both the pump and the microprocessor to generate electricity to drive the pump, the microprocessor, or both the pump and the microprocessor.

5. The water collection, storage, and distribution system of claim 1, wherein the system further includes a solar heating system comprising an array of solar absorber panels for capturing heat during daylight hours, a heat sink for storing the capture heat, a heat exchanger for delivering the heat to the water in the storage tank during nighttime hours, and a solar circulation pump for circulating coolant from the absorber panels to the heat sink and to the heat exchanger.

6. A water storage tank for a water collection, storage, and distribution system, the water storage tank comprising:
   a. an inlet for receiving water into the storage tank from a source of water;
   b. a primary outlet for discharging water from the storage tank to a downstream storage tank or a water utilization system;
   c. an alternate outlet for discharging water from the storage tank to an alternate destination;
   d. a pump for pumping the water out of the storage tank through the primary outlet or the alternate outlet; and
   e. a water level monitoring system for controlling the operation of the pump comprising:
      i. water level sensor for measuring the water level in the storage tank and producing a water level signal for the storage tank;
      ii. a microprocessor for receiving the water level signal indicative of the water level in the downstream storage tank; wherein the microprocessor activates the pump to pump water from the storage tank to the downstream storage tank through the primary outlet when the downstream storage tank is not full and to pump water from the storage tank to the alternate destination through the alternate outlet when the downstream storage tank is full.

7. The water storage tank of claim 6, wherein the storage tank further includes a temperature sensor for measuring the temperature of the water in the storage tank and producing a temperature signal, wherein the temperature signal is connected to the microprocessor, and if the microprocessor determines that the water in the storage tank is likely to freeze, the microprocessor activates the pump to pump water from the storage tank through the alternate outlet.

8. The water storage tank of claim 6, wherein the storage tank further includes a water flow sensor for measuring the flow of water through the storage tank and producing a water flow signal indicative of the flow of water through the storage tank, wherein the water flow signal is connected to the microprocessor, and if the microprocessor determines that the water in the storage tank is about to become stagnant based on the flow of water through the storage tank, the microprocessor activates the pump to pump water from the storage tank through the alternate outlet.

9. The water storage tank of claim 6, wherein the storage tank further includes a photovoltaic panel associated with the storage tank and connected to the pump, to the microprocessor, or to both the pump and the microprocessor to generate electricity to drive the pump, the microprocessor, or both the pump and the microprocessor.

10. The water storage tank of claim 6, wherein the storage tank further includes a solar heating system comprising an array of solar absorber panels for capturing heat during daylight hours, a heat sink for storing the capture heat, a heat exchanger for delivering the heat to the water in the storage tank during nighttime hours, and a solar circulation pump for circulating coolant from the absorber panels to the heat sink and to the heat exchanger.

11. A smart water pump for a water storage tank comprising:
   a. a pump intake for receiving water the storage tank;
   b. a primary outlet for discharging water from the storage tank to a downstream storage tank or a water utilization system;
   c. an alternate outlet for discharging water from the storage tank to an alternate destination;
   d. a pump for drawing water through the pump intake and for pumping the water out of the storage tank through the primary outlet or the alternate outlet; and
   e. a water level monitoring system for controlling the operation of the pump comprising:
      i. water level sensor for measuring the water level in the storage tank and producing a water level signal for the storage tank;
      ii. a microprocessor for receiving the water level signal indicative of the water level in the downstream storage tank;
   wherein the microprocessor activates the pump to draw water through the pump intake and to pump water from the storage tank to the downstream storage tank through the primary outlet when the downstream storage tank is not full and to pump water from the storage tank to the alternate destination through the alternate outlet when the downstream storage tank is full.

12. The smart water pump of claim 11, wherein the smart pump further includes a temperature sensor for measuring the temperature of the water in the storage tank and producing a temperature signal, wherein the temperature signal is connected to the microprocessor, and if the microprocessor determines that the water in the storage tank is likely to freeze, the microprocessor activates the pump to draw water through the pump intake and to pump water from the storage tank through the alternate outlet.

13. The smart water pump of claim 11, wherein the smart pump further includes a water flow sensor for measuring the flow of water through the storage tank and producing a water flow signal indicative of the flow of water through the storage tank, wherein the water flow signal is connected to the microprocessor, and if the microprocessor determines that the water in the storage tank is about to become stagnant based on the flow of water through the storage tank, the microprocessor activates the pump to draw water through the pump intake and to pump water from the storage tank through the alternate outlet.

14. The smart water pump of claim 11, wherein the smart pump further includes a photovoltaic panel connected to the pump, to the microprocessor, or to both the pump and the microprocessor to generate electricity to drive the pump, the microprocessor, or both the pump and the microprocessor.

15. The smart water pump of claim 11, wherein the smart pump further includes a solar heating system comprising an array of solar absorber panels for capturing heat during daylight hours, a heat sink for storing the capture heat, a heat exchanger for delivering the heat to the water in the storage tank during nighttime hours, and a solar circulation pump for circulating coolant from the absorber panels to the heat sink and to the heat exchanger.

\* \* \* \* \*